United States Patent [19]
Nichols, deceased

[11] 3,871,465
[45] Mar. 18, 1975

[54] VEHICLE WITH VERTICALLY MOVABLE POWER WHEELS

[76] Inventor: Frank R. Nichols, deceased, late of 162 N. Holmes, Memphis, Tenn. 38111 by Pauline Harris Nichols, executrix

[22] Filed: Nov. 10, 1972

[21] Appl. No.: 305,490

[52] U.S. Cl......... 180/24.02, 180/65 R, 280/43.23, 280/104.5 B
[51] Int. Cl............................................. B62d 61/12
[58] Field of Search.... 180/65 F, 65 A, 65 R, 44 M, 180/24.02, 64 M, 64 MM, 21, 24.01, 15, 71; 280/43.23, 71, 104.5 A, 104.5 B; 105/215 R, 75, 30

[56] References Cited
UNITED STATES PATENTS

| | | | |
|---|---|---|---|
| 271,129 | 1/1883 | Rowe | 180/15 |
| 1,551,594 | 9/1925 | Walter | 180/65 R |
| 3,136,379 | 6/1964 | Lauster | 180/24.02 X |
| 3,443,655 | 5/1969 | Beck et al. | 180/65 F |
| 3,499,663 | 3/1970 | Hedlund et al. | 180/24.02 X |
| 3,502,165 | 3/1970 | Matsukata | 180/65 A X |
| 3,659,671 | 5/1972 | Heinze | 180/24.02 |

Primary Examiner—David Schonberg
Assistant Examiner—David M. Mitchells
Attorney, Agent, or Firm—John R. Walker, III

[57] ABSTRACT

An electric powered vehicle having support wheels for supporting the vehicle on a roadway and having power wheels for driving the vehicle over the roadway. Means is included to variably force the power wheels into frictional engagement with the roadway whereby the weight of the vehicle can be partially transferred from the support wheels to the power wheels for increasing the traction between the power wheels and the roadway.

3 Claims, 3 Drawing Figures

VEHICLE WITH VERTICALLY MOVABLE POWER WHEELS

BACKGROUND OF THE INVENTION

1. Field of the Invention

This invention relates to the construction of a vehicle which can be effectively powered by an electric motor.

2. Description of the Prior Art

A preliminary patentability search revealed the following U.S. patents: Pieper No. 937,859; Willock No. 2,659,446; Tuck No. 3,352,373; Beck et al. No. 3,443,655; and Matsukata No. 3,502,165. None of the above references disclose or suggest the present invention.

Pieper discloses a motor vehicle having an internal combustion engine and a dynamo motor. Both the internal combustion engine and the dynamo motor are connected to separate drive wheels of the vehicle. Willock discloses a rear end suspension for motor trucks whereby heavy loads can be carried on four rear wheels and light loads can be carried on two rear wheels. Tuck discloses a vehicle with plural axles and means to provide maximum tractive effort for each axle at the same speed. Beck et al discloses a motorized wheel assembly in which the wheel housing functions as a load carrying member. Matsukata discloses a combination gas and electric driven vehicle with retractable wheels. A pair of retractable rear wheels are powered by a gas engine and a second pair of rear wheels are powered by an electric motor. When it is desired to use the electric motor, the gas driven wheels are retracted, leaving only the electric driven wheels contacting the ground. On the other hand, when it is desirable to use the gas engine, the gas driven wheels are extended, raising the electric driven wheels off the ground.

It should be pointed out that, in general, one of the most common problems in previous electric powered vehicles was that of limited range.

SUMMARY OF THE INVENTION

The present invention is directed towards overcoming the problems and disadvantages in previous electric powered vehicles. The concept of the present invention is to provide an electric powered vehicle having support wheels for supporting the vehicle on a roadway and having power wheels for driving the vehicle over the roadway. Means is included for providing variable traction between the power wheels and the roadway. By having variable traction between the power wheels and the roadway, the vehicle requires less power than previous electric powered vehicles.

The present invention greatly increases the range of electric powered vehicles by reducing the power needed to drive the vehicles. This reduction in power is accomplished by maintaining only enough weight on the power wheels to provide the needed traction to move the vehicle while the vehicle is substantially supported by support wheels. In this manner, unnecessary drag is not placed on the power wheels.

DESCRIPTION OF THE PREFERRED EMBODIMENT

Figure 1:
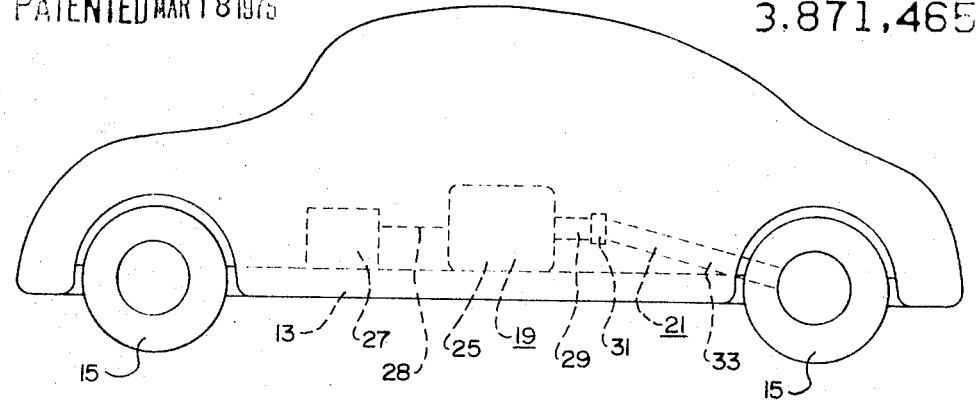
FIG. 1 is a side view of the electric powered vehicle of the present invention.
Figure 2:
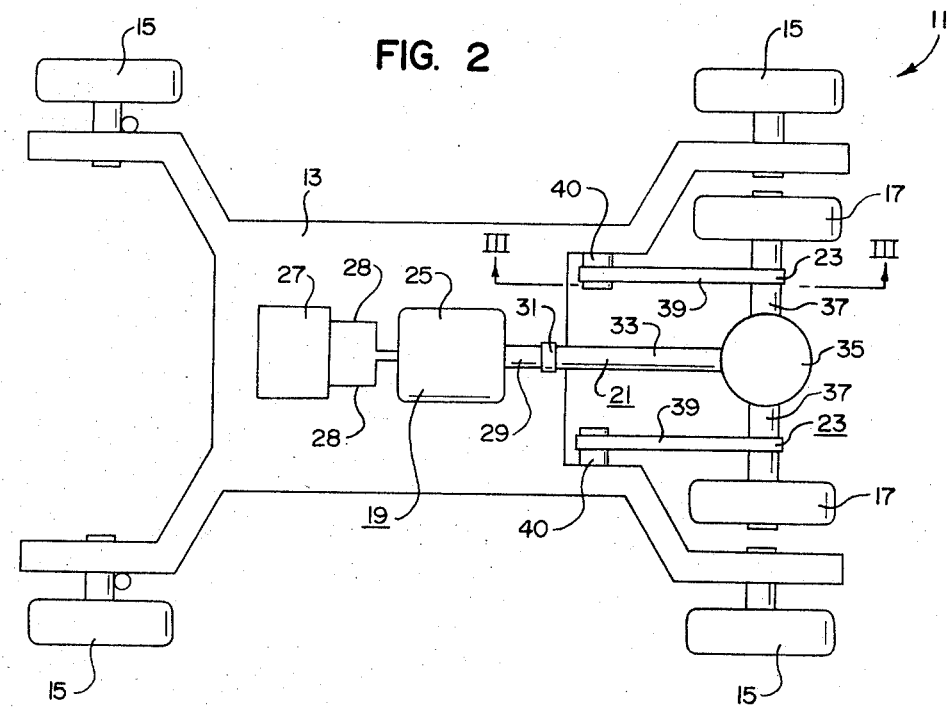
FIG. 2 is a diagrammatic plan view of the present invention with some parts removed for clarity.
Figure 3:
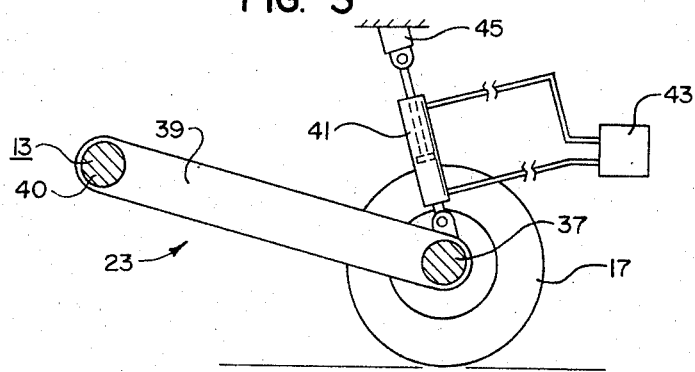
FIG. 3 is a sectional view of a portion of the present invention taken as on the line III—III of FIG. 2.

The electric powered vehicle 11 of the present invention includes a chassis 13. Support wheels 15 are rotatably mounted on the chassis 13 for supporting the vehicle on a roadway. One or more power wheels 17 are adjustably mounted on the chassis 13 for frictionally engaging the roadway. Preferably, the vehicle 11 includes two power wheels 17. A motor means 19 is mounted on the chassis 13 and is attached to the power wheels 17 by a coupling means 21 which transmits power from the motor means 19 to the power wheels 17. Means 23 is provided for variably forcing the power wheels 17 into frictional engagement with the roadway whereby the weight of the vehicle 11 can be partially transferred from the support wheels 15 to the power wheels 17 for increasing the traction between the power wheels 17 and the roadway. Means 23 is positioned between the power wheels 17 and the chassis 13.

Preferably, the motor means 19 includes an electric motor 25 and means for supplying electrical energy to the electric motor 25 such as batteries 27. The batteries 27 are connected to the electric motor 25 by cables 28. It should be noted that a gas operated generator or the like could be substituted for the batteries 27. The electric motor 25 includes an output shaft 29. The coupling means 21 includes a universal joint 31 attached to the output shaft 29 of the electric motor 25 for allowing relative movement between the motor 25 and the power wheels 17, a drive shaft 33 attached to the universal joint 31 opposite the output shaft 29, a differential means 35 attached to the drive shaft 33 opposite the universal joint 31, and axle means 37 attached to the differential means 35 and to the power wheels 17. Means 23 for variably forcing the power wheels 17 into frictional engagement with the roadway includes arm or connecting means 39 pivotally attached to the chassis 13 as at pivots 40 and to the axle means 37, motor means for applying a force against the connecting means 39 such as a fluid piston means 41, and means 43 for activating the piston means 41, such as suitable controls, source of fluid under pressure, etc., well known to those skilled in the art (see, for example, the Willock Patent). It should be noted that a shock absorber means 45 may be positioned adjacent the fluid piston means 41.

In operation, the vehicle 11 conserves the power of the batteries 27 by reducing the load on the power wheels 17. That is, the power required to move the vehicle 11 is less when there is less weight on the power wheels 17. For example, it is known that less horsepower is consumed by a trailer truck pulling a heavy load where the weight of the load is not directly on the power wheels than by a conventional automobile or truck in which the weight of the load is directly on the power wheels. Since the entire weight of the vehicle 11 is not normally required to maintain traction, power is conserved by having only enough weight applied to the power wheels 17 to maintain traction. The amount of weight applied to the power wheels 17 will vary according to the physical characteristics of the roadway. That is, more traction would be needed to be applied by the power wheels when the roadway is hilly than when it is level, when the roadway is wet than when it is dry, etc.

It should be noted that two electric motors could be included in the vehicle 11: a large motor for starting the vehicle 11 moving and a small motor for keeping it moving. In this manner, even more power would be conserved because the small motor would require less power to operate than the large motor.

Although the invention has been described and illustrated with respect to a preferred embodiment thereof, it is not to be so limited since changes and modifications may be made therein which are within the full intended scope of the invention.

I claim:

1. A vehicle for travel over a roadway, said vehicle comprising: a chassis, support wheels rotatably mounted on said chassis for supporting said vehicle on the roadway, at least a pair of power wheels adjustably mounted from said chassis for substantially vertical movement relative to said chassis to allow variable frictional engagement with the roadway, a motor means mounted on said chassis, coupling means between said motor means and said power wheel for transmitting power from said motor means to said power wheels, and means for variably forcing said power wheels into frictional engagement with the roadway to provide the needed traction to move said vehicle while said vehicle is substantially supported by said support wheels thereby reducing the power needed to move said vehicle to a minimum; said coupling means comprising a universal joint attached to the output shaft of said motor means for allowing relative movement between said motor means and said pair of power wheels, a drive shaft attached to said universal joint opposite the output shaft of said motor means, differential means attached to said drive shaft opposite said universal joint, and axle means attached to said differential means and to said pair of power wheels; said means for variably forcing said pair of power wheels into frictional engagement with the roadway comprising arm means pivotally attached to said chassis and to said axle means, means for applying a force against said arm means, and means for activating said means for applying a force against said arm means; said means for applying a force against said arm means comprising a fluid piston means.

2. An electric powered vehicle for travel over a roadway, said vehicle comprising: a chassis, support wheels rotatably mounted on said chassis for supporting said vehicle on the roadway; a pair of power wheels adjustably mounted from said chassis for substantially vertical movement relative to said chassis to allow variable frictional engagement with the roadway; an electric motor mounted on said chassis; battery means for supplying electrical energy to said electric motor; coupling means between said electric motor and said pair of power wheels for transmitting power from said motor means to said pair of power wheels, said coupling means including a universal joint attached to the output shaft of said electric motor for allowing relative movement between said electric motor and said pair of power wheels, a drive shaft attached to said universal joint opposite the output shaft of said electric motor, differential means attached to said drive shaft opposite said universal joint, and axle means attached to said differential means and to said pair of power wheels; and means for variably forcing said pair of power wheels into frictional engagement with the roadway to provide the needed traction to move said vehicle while said vehicle is substantially supported by said support wheels thereby reducing the power needed to move said vehicle to a minimum, said means for variably forcing said pair of power wheels to engage the roadway including arm means pivotally attached to said chassis and said axle, fluid piston means for applying a force against said arm means, and means for activating said fluid piston means.

3. An electric powered vehicle for travel over a roadway, said vehicle comprising: a chassis, support wheels rotatably mounted on said chassis for supporting said vehicle on the roadway; a pair of power wheels adjustably mounted from said chassis for substantially vertical movement relative to said chassis to allow variable frictional engagement with the roadway; an electric motor mounted on said chassis; battery means for supplying electrical energy to said electric motor; coupling means between said electric motor and said pair of power wheels for transmitting power from said motor to said pair of power wheels, said coupling means including a universal joint attached to the output shaft of said electric motor for allowing relative movement between said electric motor and said pair of power wheels, a drive shaft attached to said universal joint opposite the output shaft of said electric motor, differential means attached to said drive shaft opposite said universal joint, and axle means attached to said differential means and to said pair of power wheels; and means for variably forcing said pair of power wheels into frictional engagement with the roadway to provide the needed traction to move said vehicle while said vehicle is substantially supported by said support wheels thereby reducing the power needed to move said vehicle to a minimum, said means for variably forcing said pair of power wheels to engage the roadway including arm means pivotally attached to said chassis and said axle, motor means for applying a force against said arm means, and means for activating said motor means.

* * * * *